United States Patent [19]

Doornhein

[11] Patent Number: 4,568,964
[45] Date of Patent: Feb. 4, 1986

[54] COLOR TELEVISION PICTURE DISPLAY DEVICE HAVING A FLICKER REDUCTION CIRCUIT

[75] Inventor: Laurens Doornhein, Eindhoven, Netherlands

[73] Assignee: U.S. Philips Corporation, New York, N.Y.

[21] Appl. No.: 558,062

[22] Filed: Dec. 5, 1983

[30] Foreign Application Priority Data

Dec. 13, 1982 [NL] Netherlands .................. 8204807

[51] Int. Cl.4 ............................................. H04N 11/20
[52] U.S. Cl. ...................................... 358/11; 358/147; 358/140
[58] Field of Search .................. 358/11, 181, 183, 147, 358/140

[56] References Cited

U.S. PATENT DOCUMENTS

| | | | |
|---|---|---|---|
| 4,329,675 | 5/1982 | Van Hulle | 358/181 |
| 4,409,617 | 10/1983 | Whitehead | 358/147 |
| 4,435,728 | 3/1984 | Raven | 358/140 |

OTHER PUBLICATIONS

Kraus, Vlakflikkerreductie in TV-Ontvangers, Elektronica, 82/4, pp. 27-33.
Vermeidung Des Grossflächenflimmerns in Fernseh-Heimempfängern, Kraus, Rundfunktech, Mitteilungen, vol. 25, (1981) No. 6, pp. 264-269.

*Primary Examiner*—Michael A. Masinick
*Attorney, Agent, or Firm*—Thomas A. Briody; William J. Streeter; Edward W. Goodman

[57] ABSTRACT

In a color television picture display device having an arrangement (47) for converting the number of fields, additional signal paths need not be provided in the arrangement for converting the number of fields, for also displaying a signal combination of high picture quality, such as, for example, a teletext signal combination, with a converted number of fields, if the transmission takes place via the arrangement for converting the number of fields, in a part of the digital signal path combination (63,97; 65,99; 67,101) for the luminance signal, for which purpose a first change-over switch (69) and a second change-over switch (111) are provided at the correct areas.

5 Claims, 2 Drawing Figures

COLOR TELEVISION PICTURE DISPLAY DEVICE HAVING A FLICKER REDUCTION CIRCUIT

BACKGROUND OF THE INVENTION

The invention relates to a color television picture display device comprising a display part, an input circuit of which is coupled to an output circuit of a digital-to-analog converter, which has an input circuit coupled to an output circuit of an arrangement for converting the number of fields, an input circuit of said arrangement being coupled to an output circuit of an analog-to-digital converter which has an input for supplying at least a luminance signal of a color television signal combination to be displayed.

From "Electronica", 82/4, pages 27–33, such a color television picture display device is known, in which either a luminance signal and two color difference signals, or a luminance signal and a chrominance signal, are supplied to an analog-to-digital converter arrangement. The analog-to-digital converter arrangement comprises three analog-to-digital converters in the first case and one such converter in the second case.

SUMMARY OF THE INVENTION

The invention has for its object to render such a color television picture display device suitable for displaying a signal combination to be added, such as, for example, a teletext signal combination or a game signal combination, without a change-over of the deflection frequency being required.

In order to achieve this object, the inputs or input of the analog-to-digital converter arrangement could have supplied to them, or to it via a change-over switch, a signal combination which is derived from the signal combination to be added and which corresponds to the combination luminance signal + color difference signal or luminance signal + chrominance signal of the color television signal. However, a lower picture quality would then be obtained compared with the picture quality that can generally be attained with the signal combination to be added.

According to the invention, a color television picture display device of the kind mentioned in the opening paragraph is therefore characterized in that there is arranged between a number of inputs of the arrangement for converting the number of fields and a number of corresponding outputs of the analog-to-digital converter, a first change-over switch that can be operated by a change-over signal and that there is arranged between a number of inputs of the picture display part and the digital-to-analog converter, a second change-over switch that can be operated by the change-over signal which is transmitted via the arrangement for converting the number of fields, whereby a binary signal combination originating from the analog-to-digital converter and a binary signal combination of a signal combination to be added, such as, for example, a teletext or game signal combination, are supplied to the first change-over switch, while analog television picture signals to be displayed and the binary signal combination of the signal combination to be added, as derived from a number of outputs of the arrangement for converting the number of fields, are supplied to the second change-over switch.

Due to this measure, the whole signal combination to be added is passed through the arrangement for converting the number of fields via a broadband transmission channel so that the picture quality is not adversely affected.

No additional signal path is required in the arrangement for converting the number of fields except for the change-over signal which comprises only one bit per picture element; this additional one-bit signal path can also be dispensed with if, according to an elaboration of the invention, the output combination of the analog-to-digital converter arrangement comprises a limiter and the signal combination to be added is transmitted via signal paths for the least significant bits of the arrangement for converting the number of fields, while outputs of the output circuit of the arrangement for converting the number of fields for the more significant bits have coupled to them a level detection circuit for obtaining the change-over signal for the second change-over switch.

DESCRIPTION OF THE DRAWINGS

The invention will now be described with reference to the drawings.

In the drawings.

DESCRIPTION OF THE PREFERRED EMBODIMENT

Figure 1:
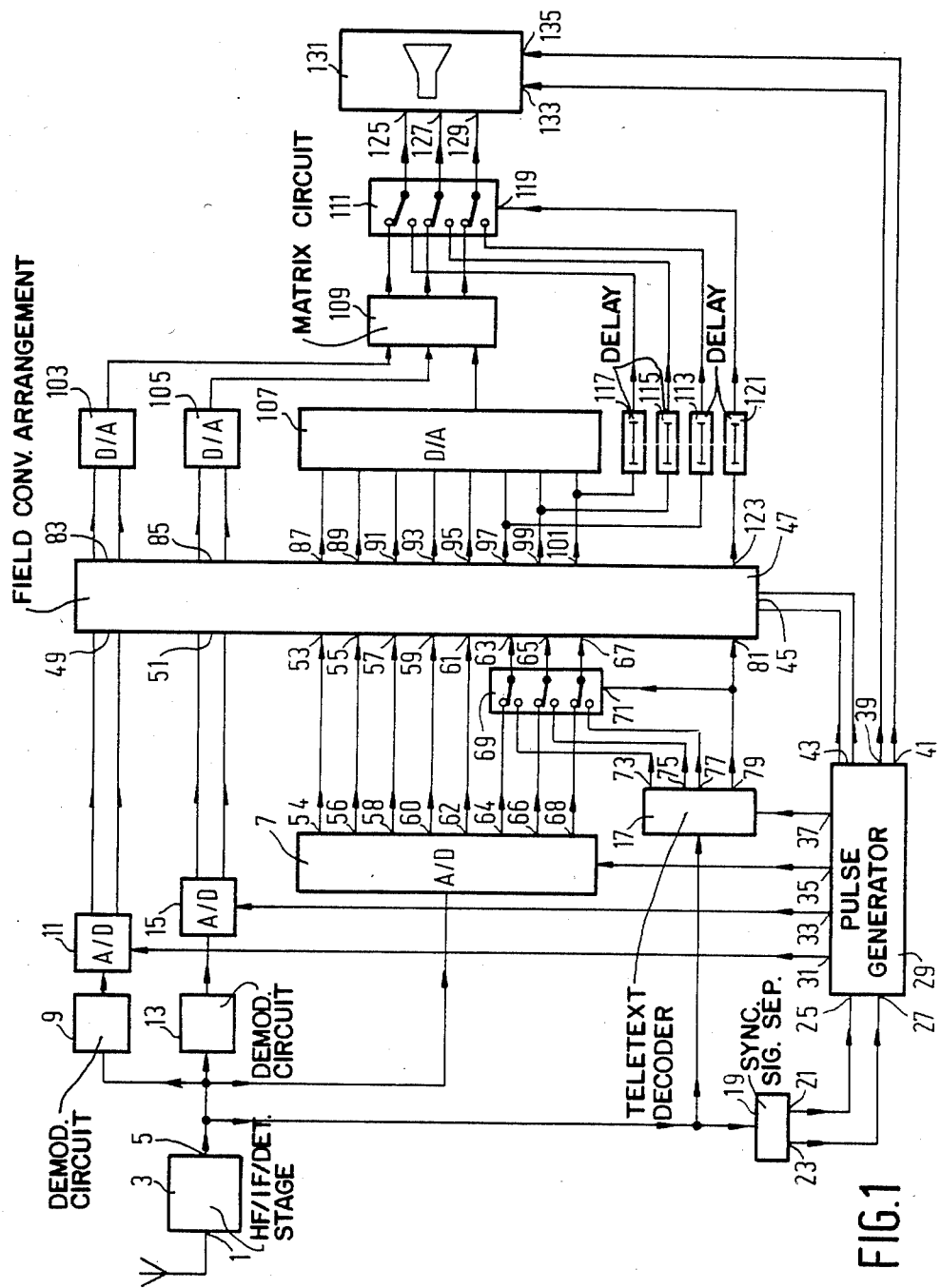
FIG. 1 shows a block-diagram of a color television picture display device according to the invention.

In FIG. 1, an input 1 of a high-frequency, intermediate-frequency and detection stage 3 has supplied to it a received color television signal, which appears in demodulated form at an output 5 thereof. The demodulated color television signal comprises a luminance signal, a chrominance signal, a synchronization signal and a teletext signal.

Of the demodulated color television signal at the output 5 of the high-frequency, intermediate-frequency and detection stage 3, the luminance signal is converted by an analog-to-digital converter 7 into a digital luminance signal combination, a component of the chrominance signal is converted by a demodulation circuit 9 and an analog-to-digital converter 11 into a digital color difference signal combination, another component of the chrominance signal is converted by a demodulation circuit 13 and an analog-to-digital converter 15 into a further digital color difference signal combination, the teletext signal is converted by a teletext decoder 17 into a digital teletext signal combination, and the synchronization signal is converted by a synchronization signal separator 19 into a synchronization signal combination comprising a horizontal and a vertical synchronization signal.

The horizontal and the vertical synchronization signals are derived from outputs 21 and 23, respectively, of the synchronization signal separator 19 and are supplied to an input 25 and an input 27, respectively, of a pulse generator 29.

The pulse generator 29 supplies, at an output 31, a clock signal of, for example, 3 MHz for the analog-to-digital converter 11, at an output 33, a clock signal of, for example, also 3 MHz for the analog-to-digital converter 15, at an output 35, a clock signal of, for example, 12 MHz for the analog-to-digital converter 7, at an output 37 a clock signal of, for example, also 12 MHz for the teletext decoder 17, at an output 39, a horizontal synchronization signal of substantially twice the frequency of the horizontal synchronization signal at the input 25, at an output 41, a vertical synchronization signal of substantially twice the frequency of the vertical synchronization signal at the input 27, and at an output combination 43, a control signal combination which is supplied to an input combination 45 of an arrangement 47 for converting the number of fields. This control signal combination comprises inter alia writing and reading clock signals and horizontal and vertical synchronization signals.

Input combinations 49 and 51 of the arrangement 47 for converting the number of fields have supplied to them the digital color difference combinations originating from the analog-to-digital converters 11 and 15, respectively.

Five inputs 53,55,57,59 and 61 of a further input combination of the arrangement 47 for converting the number of fields are directly connected to five corresponding outputs 54,56,58,60 and 62, and three inputs 63,65 and 67 are connected via a first change-over switch 69 to three corresponding outputs 64,66 and 68, of the analog-to-digital converter 7 for the luminance signal.

The first change-over switch 69 may have the switched position shown or the alternate position switched under the influence of a change-over signal which is supplied to an input 71 thereof. The inputs 63,65,67 of the arrangement 47 for converting the number of fields are connected in the position shown to the outputs 64,66,68 of the analog-to-digital converter 7 and are connected in the alternate position (not shown) to three outputs 73, 75, 77 of the teletext decoder 17, which each supply a binary color signal. This combination of binary color signals is referred to hereinafter also as the signal combination to be added and may also originate from another source, for example, a game circuit arrangement. The sample frequency thereof has to be, or to become, coupled to that of the analog-to-digital converter 7.

The change-over signal at the input 71 of the first change-over switch 69 originates from an output 79 of the teletext decoder 17 and is also supplied to an input 81 of the arrangement 47 for converting the number of fields. The change-over signal can be produced by a logic OR combination of a blanking or box signal and a monochrome teletext signal, the latter signal in turn being an OR combination of the three signals at the outputs 73, 75 and 77 of the teletext decoder 17. As a result, when a teletext signal is used for subtitling purposes, the change-over switch 69 is in the alternate position (not shown) only for the time corresponding to the subtitle space.

In the arrangement 47 for converting the number of fields, the signal combinations at the input combinations 49,51 and 53,55,57,59,61,63,65,67 are sampled by means of the signals at the input combination 45 at a clock frequency of, for example, 18 MHz and are made sequential in the order of succession Y, Y,U,Y,Y,V, ..., where Y represents the luminance signal samples and U and V represent the color difference signal samples. By means of a memory circuit comprising, for example, two field memories, one of which is written, while the other is read two times in succession, the field frequency is then doubled, after which the sequential signal Y,Y,U,Y,Y,V, ... is converted again into a number of simultaneous signal combinations, of which the color difference signal combinations appear at an output combination 83 and 85, respectively, and the luminance signal combination appears at an output combination 87,89,91,93,95,97,99,101.

The color difference signal combinations are supplied via digital-to-analog converters 103 and 105, and the luminance signal combination is supplied via a digital-to-analog converter 107 and a matrix circuit 109, to a second change-over switch 111, which has further supplied to it, via delay correction circuits 113, 115,117, signals originating from the outputs 97,99,101 of the arrangement 47 for converting the number of fields.

The second change-over switch 111 is operated by a change-over signal which is applied to an input 119 thereof and is supplied via a delay correction circuit 121 from an output 123 of the arrangement 47 for converting the number of fields.

Between the input 81 and the output 123 of the arrangement 47 for converting the number of fields, there is arranged a one-bit transmission channel having the same transmission properties as that arranged between the input combination 53,55,57,59,61,63,65,67 and the output combination 87,89,91,93,95,97,99,101 thereof.

There are obtained from the change-over switch 111 three color signals which are supplied to three inputs 125, 127, 129 of a picture display part 131. The deflection circuits (not shown) of the picture display part 131 are synchronized by synchronization signals supplied to two inputs 133 and 135 and originating from the outputs 39 and 41 of the pulse generator 29.

The color signals at the inputs 125,127,129 of the picture display part 131 are, for the positions shown of the first and the second change-over switches 69 and 111, respectively, the color signals obtained from the luminance signal and the color difference signals of a received color television signal.

If the first change-over switch 69 is changed over to the alternate position (not shown) due to the change-over signal at its input 71, the outputs 73,75,77 of the teletext decoder 17 are connected to the inputs 63,65,67, as a result of which the signal combination to be added, which is transmitted from the inputs 63,65,67 to the outputs 97,99,191, is supplied to the second change-over switch 111 at instants determined by the arrangement 47 for converting the number of fields. This second change-over switch 111 is changed over to the alternate position (not shown) by the change-over signal at its input 119 at instants corresponding to the operation of the first change-over switch 69. The picture display part 131 then receives the color signals of the added signal combination, in this case the teletext picture. Since this signal combination is also passed via the arrangement for converting the number of fields, it can also be displayed at the double field frequency. A change-over need not take place in the deflection circuits of the picture display part 131.

The transmission of the signal combination to be added and the change-over signal takes place entirely via channels which are sampled at a sample frequency sufficiently high for the teletext signal, in this case the same frequency as that of the luminance signal. The picture quality is then not adversely affected, as indeed would have been the case if in a more obvious manner the color signal components of the teletext signal would have been first converted into luminance and color difference signals and the change-over switch would have been arranged in front of the analog-to-digital converters 11,15,7, in which event a second change-over switch 111 would not be required.

Figure 2:
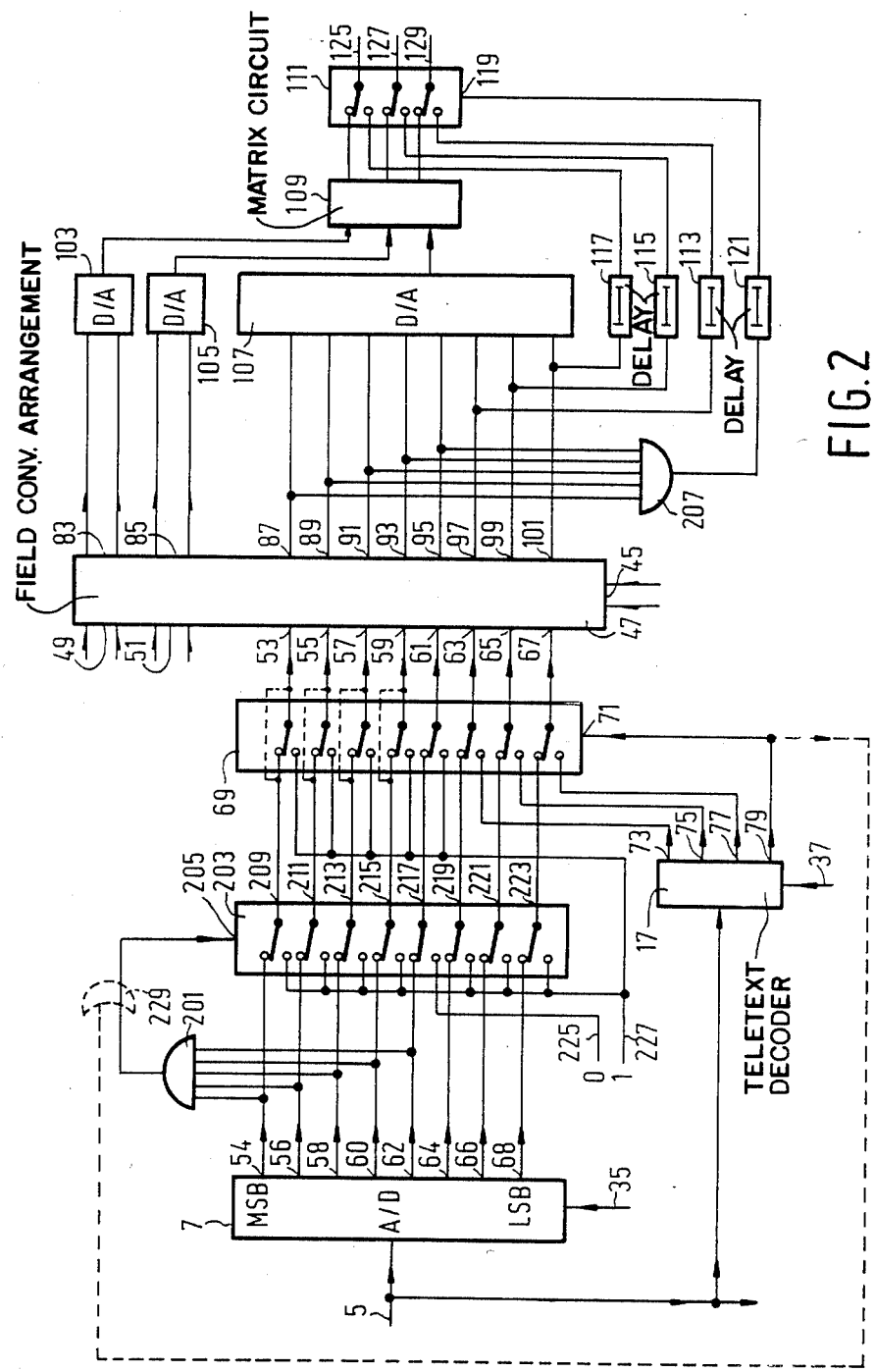
FIG. 2 shows a block diagram of an elaboration of a part of a color television picture display device according to the invention.

There is still required an additional transmission signal path from the input 81 to the output 123 of the arrangement 47 for converting the number of fields, which, if desired, may be dispensed with if the circuit arrangement shown in FIG. 2 is used.

In FIG. 2, corresponding parts are designated by the same reference numerals as in FIG. 1. Reference is made to this Figure for their description. Parts of the circuit arrangement, which are not essential for a clear understanding of the modifications of the circuit arrangement of FIG. 2 with respect to the circuit arrangement of FIG. 1, are omitted.

The modifications with respect to FIG. 1 are:

there is arranged in front of the first change-over switch 69, which has a larger number of change-over contacts than in the case of FIG. 1, a limiter circuit having an AND gate 201 and a third change-over switch 203, of which an operating signal input 205 is connected to the output of the AND gate 201. The change-over signal at the input 119 of the second change-over switch 111 is now obtained from an AND gate 207 which serves as a level detection circuit and of which the inputs are connected to the outputs 87,89,91,93 and 95 of the arrangement 47 for converting the number of fields. The input 81 and the output 123 of the arrangement 47 for converting the number of fields are dispensed with.

The inputs of the AND gate 201 are connected to the outputs 54,56,48,60 and 62 of the analog-to-digital converter 7. The most significant bits of the digital luminance signal combination appear at these outputs. The output of the AND gate 201 consequently becomes "one" if the digital signal combination at the outputs 54,56,58, 60,62,64,66,68 of the analog-to-digital converter 7 is 11111000 or larger. The third change-over switch 203 then occupies the alternate position (not shown).

In the position shown of the third change-over switch 203, an output combination 209,211,213,215,217, 219,221,223 thereof is connected to the outputs 54,56,58, 60,62,64,66,68 of the analog-to-digital converter 7. In the alternate position (not shown) of the third change-over switch 203, a digital signal combination 11110111 originating from an input combination of the third change-over switch 203 connected to a "zero" input 225 and a "one" input 227 is supplied to the outputs 209,211,213,215,217, 219,221,223 of the third change-over switch. Consequently, digital combinations larger than 11110111 cannot occur at the outputs 209,211,213,215,217,219,221,223 of the third change-over switch 203. This means that eight levels of the digital output combination of the analog-to-digital converter 7 can no longer be utilized for the transmission of a luminance signal. At the two hundred and fifty-six possible levels, this practically does not lead to a limitation.

In the position shown, the first change-over switch 69 produces the signal combination originating from the outputs 209,211,213,215,217,219,221,223 of the third change-over switch 203 at the inputs 53,55,57,59,61,63, 65,67 of the arrangement 47 for converting the number of fields. This is a luminance signal combination having a maximum value 11110111, which consequently never can cause the output of the AND gate 207 connected to the outputs 87,89,91,93,95 of the arrangement 47 for converting the number of fields to become "one". Therefore, no luminance signal combination can influence the output of the AND gate 207.

If the first change-over switch 69 is changed over to the position alternate (not shown) due to the change-over signal at its input 71, the inputs 53,55,57, 59,61 of the arrangement 47 for converting the number of fields are connected to the "one" input 227 so that a signal combination 11111 is supplied to them, while the signal combination to be added at the outputs 73,75,77 of the teletext decoder 17 is supplied to the inputs 63,65,67.

At corresponding instants, the digital signal combination 11111 appears at the outputs 87,89,91,93,95 of the arrangement 47 for converting the number of fields and the signal combination to be added appears at the outputs 97,99,101. The AND gate 207 then changes the second change-over switch 111 over to the alternate position (not shown) so that the signal combination to be added is supplied to the inputs 125,127,129 of the picture display part 131.

If the outputs 209,211,213,215 of the third change-over switch 203 are connected to the inputs 53,55,57,59 of the arrangement 47 for converting the number of fields and the output 79 of the teletext decoder 17 is connected to an input of an OR gate 229, the other input of which is connected to the output of the AND gate 201 and the output of which is connected to the input 205 of the third change-over switch 203, as is indicated by dotted lines in FIG. 2, the four upper change-over contacts of the first change-over switch 69 can be dispensed with.

It is also possible to limit the luminance signal with the limiter circuit 201,203 so that no luminance signal combinations having a value smaller than 00001000 are transmitted. The input 221 then has to be made "one" and the input 227 has to be made "zero", while the AND gates 201 and 207 have to become NOR gates.

In both cases, the signal combination to be added has to be inserted into the least significant part of the digital luminance signal combination. In the circuit arrangement of FIG. 1, the signal combination to be added may also be inserted into other parts of the digital luminance signal combination.

If the analog-to-digital converter 7 is designed for the conversion of a combination of the luminance signal and the chrominance signal, the analog-to-digital converters 11,15 can be dispensed with and the demodulation circuits 9,11 are arranged at the output of the digital-to-analog converter 107. The remaining part of the circuit arrangement then remains substantially unchanged.

The high-frequency, intermediate-frequency and detection stage 3 may be accommodated, if desired, in a separate device.

Although in the embodiments described the signal combination to be added was a teletext signal combination, of course any other suitable signal combination, such as, for example, that originating from a game circuit, may be added.

In the Figures, the change-over switches 69, 111,203 are indicated in a simple manner; as a matter of course, they are constructed as electronic switches.

What is claimed is:

1. A color television picture display device comprising an analog-to-digital converter for supplying, at a plurality of outputs, a digital signal representing at least a luminance signal, applied to an input thereof, of a color television signal combination to be displayed; an arrangement for converting the number of fields having a plurality of inputs coupled, respectively, to said plurality of outputs of said analog-to-digital converter, and a corresponding plurality of outputs; a digital-to-analog converter having a plurality of inputs coupled, respectively, to said plurality of outputs of said converting arrangement, and an output; and a display part coupled to the output of said digital-to-analog converter; characterized in that said color television picture display device further comprises a source for providing a binary signal combination; a first change-over switch having a control input, a first set of inputs coupled to a number of said plurality of outputs of said analog-to-digital converter, a second set of inputs coupled to a respective number of outputs of said source, and a set of outputs coupled to a respective number of said plurality of inputs of said converting arrangement; and a second change-over switch having a control input, a first set of inputs coupled to the output of said digital-to-analog converter, a second set of inputs coupled to a number of said plurality of outputs of said converting arrangement which correspond with said number of inputs thereof, and an output coupled to said display device, whereby, on application of respective switching signals to the control input of said first change-over switch and to the control input of said second change-over switch, the binary signal combination from said source is applied to said converting arrangement and the corresponding outputs from said converting arrangement are applied directly to said display part.

2. A color television picture display device as claimed in claim 1, characterized in that the binary signal combination is a teletext signal combination and the switching signal for the control input of said first change-over switch is an OR combination of binary teletext color signals and a teletext blanking signal.

3. A color television picture display device as claimed in claim 1, characterized in that said converting arrangement further comprises an additional output coupled to the control input of said second change-over switch, and an additional input to which said switching signal is applied.

4. A color television picture display device as claimed in claim 1, characterized in that said analog-to-digital converter comprises a limiter coupled to the plurality of outputs thereof; said number of said plurality of outputs of said analog-to-digital converter and of said plurality of inputs of said converting arrangement comprises the least significant bits of said digital signal; and said color television picture display device further comprises a level detection circuit coupled to the remainder of said plurality of outputs of said converting arrangements other than said number of said plurality of outputs, for generating said switching signal for the control input of said second change-over switch.

5. A color television picture display device as claimed in claim 4, characterized in that the binary signal combination is a teletext signal combination and the switching signal for the control input of the first change-over switch is an OR combination of binary teletext color signals and a teletext blanking signal.

* * * * *